United States Patent [19]
Laliberte

[11] Patent Number: 4,684,299
[45] Date of Patent: Aug. 4, 1987

[54] LIBERTY JIG
[76] Inventor: Roger J. Laliberte, 26 Beach Ave., Port Jefferson Station, N.Y. 11776
[21] Appl. No.: 903,731
[22] Filed: Sep. 4, 1986

Related U.S. Application Data

[63] Continuation-in-part of Ser. No. 754,946, Jul. 15, 1985, abandoned.

[51] Int. Cl.⁴ ............................................... B23B 49/00
[52] U.S. Cl. ................................. 408/115 R; 33/672; 408/72 R
[58] Field of Search ............... 408/72 R, 72 B, 115 R, 408/115 B, 109; 33/185 R, 189

[56] References Cited

U.S. PATENT DOCUMENTS

| | | | |
|---|---|---|---|
| 1,269,811 | 6/1918 | Heritage | 408/109 |
| 2,083,490 | 6/1937 | Boker | 408/115 |
| 2,367,582 | 1/1945 | Honyoust | 408/115 |
| 2,435,256 | 2/1948 | Whitmore | 408/115 |
| 2,560,382 | 7/1951 | Barr | 408/109 |
| 2,591,814 | 4/1952 | Hill | 33/189 |
| 2,838,966 | 6/1958 | Campbell | 408/115 |
| 3,583,823 | 6/1971 | Eaton | 408/115 |
| 4,445,277 | 5/1984 | Keefe | 408/115 |

Primary Examiner—Gil Weidenfeld
Assistant Examiner—Daniel W. Howell
Attorney, Agent, or Firm—Leonard Belkin

[57] ABSTRACT

A jig for use in locating and drilling hole positions in cabinet doors and drawers. The jig comprises a stationary L-shaped member for placement at the corner of the door or drawer. A slidable member adjusts for direction along one axis and a pair of slides on the slidable member move along an axis perpendicular to the first axis. The slides are of transparent material and have guides to accommodate a drill bit.

6 Claims, 10 Drawing Figures

LIBERTY JIG

BACKGROUND OF THE INVENTION

This application is a contiuation-in-part of my application Ser. No. 754,946 filed on July 15, 1985, now abandoned. The present invention relates to a jig for use in locating and drilling hole positions in cabinet doors and drawers for handles and pulls.

At the present time in the custom manufacture of cabinets such as kitchen cabinets it is customary for the skilled craftsman to locate the drill hole positions for handles or pulls by using rulers or other measuring devices to locate the positions. Mistakes are costly as it is difficult to correct any errors and for the most part a new door must be prepared and substituted for the one with the error.

In some situations where a large number of doors are to be prepared with the same hole positions the craftsmen may prepare a jig for the particular job and discard the device when the work is completed.

There have been many attempts to design a jig which is capable of being adjusted for each application to insure uniform placement of the hole positions and permit reuse of the device for other jobs where the dimensions change.

An example of such a device is the template disclosed in U.S. Pat. No. 4,257,166. In that device a plate carries a number of a seemingly random arrangement of holes for drill positions and the plate is moved in a jig arrangement to obtain the desired location. In addition there are provided adjustable edge guide assemblies for locating the plate on each cabinet door. In that arrangement it appears to be difficult or impossible to accommodate all possible hole sizes, placements, or spacings as well as being awkward to use.

U.S. Pat. No. 4,445,277 illustrates a device for locating the placement of locks on doors. This arrangement lacks the capability of rendering a spacing from two sides of the door as well as having certain other deficiencies rendering it impractical for use to locate drill hole positions for pulls on cabinet doors.

U.S. Pat. No. 3,144,719 discloses a jig for locating the parts of two-component cabinet latches so that they will come together properly when the cabinet doors are in use. This jig locates simultaneously the screw positions on the door and the stationary part of the cabinet and will not be useful for the purposes of this invention.

U.S. Pat. No. 3,039,199 is directed to a carpenter's jig which is nothing more than an elaborate measuring device or ruler with guides. The jig appears to measure along one axis only.

U.S. Pat. No. 3,246,399 discloses a drawer and door pull locating tool comprising a base plate and a slidable cross member. The holes in the base plate are not adjustable with respect to each other so that spacings which are not standard could cause a problem. Also, the jig measures along one axis only at one time.

U.S. Pat. No. 2,821,027 shows an elaborate scaling device made up of movable scales with marking devices. It does not incorporate positive means for engaging the edges of the cabinet door.

SUMMARY OF THE INVENTION

In this invention there is provided a reusable jig arrangement which makes it possible for a cabinet maker to locate accurately and quickly with ease the drill holes for pulls on cabinet doors and drawers.

In accordance with a preferred embodiment of this invention there is provided an adjustable jig for locating drill holes on cabinet doors and drawers comprising a stationary L-shaped member for engaging the corner of a cabinet door or drawer, and a sliding member mounted on the L-shaped member for movement with respect to the latter on one surface of the door or drawer along an axis perpendicular to one leg of the L-shaped member. The slide member has an elongated slot extending at right angles to the aforesaid axis of movement, and a pair of slides are mounted across the slot for movement along the length of the latter. Each of the slides is provided with a hollow sleeve to accommodate a drill bit for the hole size to be drilled. In one embodiment, the slides are interconnected for simplified adjustment for proper spacing of the holes. Provision is made to lock all of the sliding members once the hollow sleeves are properly located to permit the jig to be moved from one cabinet door or drawer to another and insure identical placement of the holes.

It is thus a principal object of this invention to provide a jig for locating drill hole positions in cabinet doors and drawers for handles and pulls.

Other objects and advantages of this invention will hereinafter be obvious from the following description of preferred embodiments of this invention.

DETAILED DESCRIPTION OF THE PREFERRED EMBODIMENTS

Figure 3:
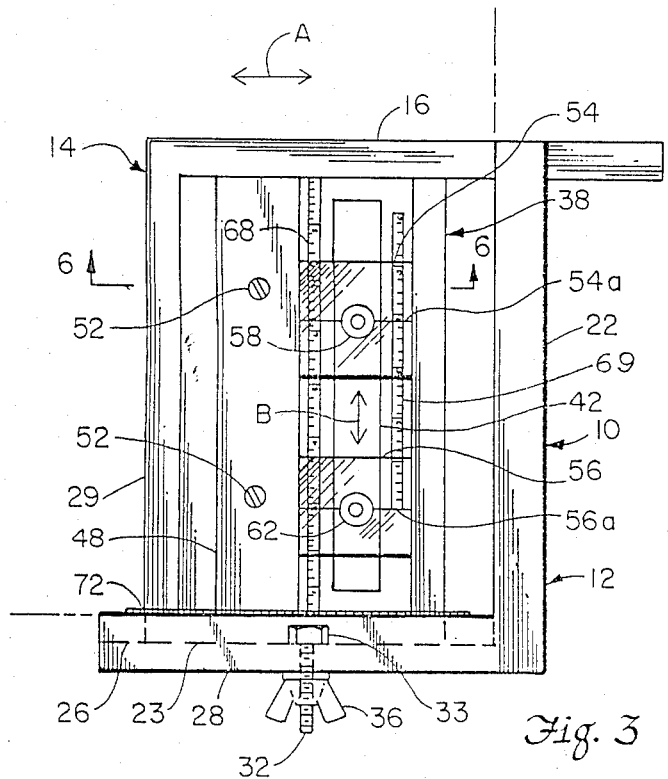
FIG. 3 is a front view of the preferred embodiment of this invention shown in FIG. 1.
Figure 4:
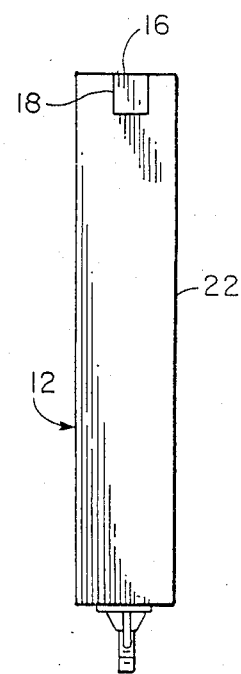
FIG. 4 is a right side view of the jig shown in FIG. 3.
Figure 5:
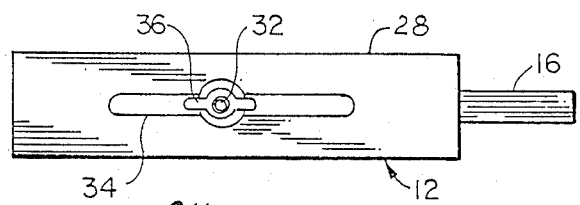
FIG. 5 is a view from the bottom of the jig shown in FIG. 3.
Figure 1:
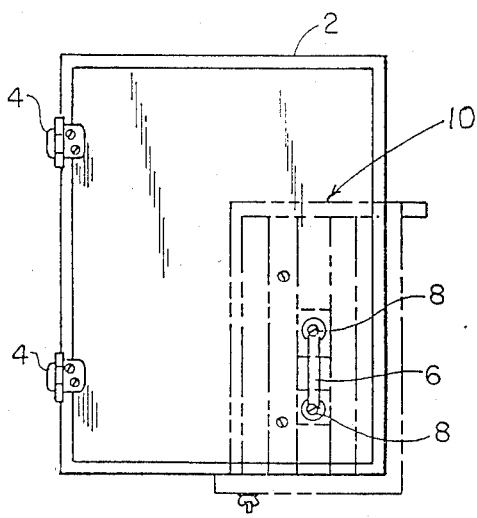
FIG. 1 is a front view of a cabinet door for which the present invention may be employed to locate and drill pull screw positions.

Referring to FIG. 1, there is illustrated a cabinet door 2 having a pair of hinges 4 and a handle or pull 6 mounted thereon utilizing a pair of screws 8. The purpose of this invention is to produce a device capable of initially locating accurately the holes for screws 8 and thereafter in other identical doors, both left and right side opening accurately without futher measuring.

Figure 2:
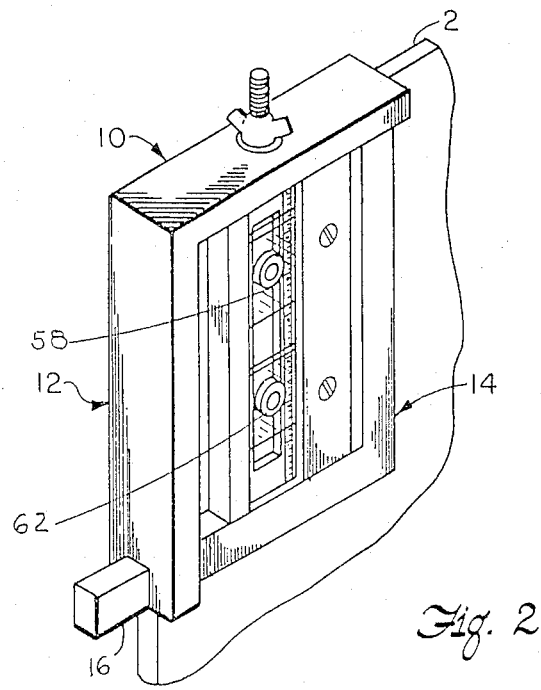
FIG. 2 is an isometric view of a preferred embodiment of this invention placed on a cabinet door.

Shown in phantom in FIG. 1 and also in FIG. 2 is a jig 10 incorporating the principles of this invention placed on cabinet door 2 for locating the above described screw holes.

Referring to FIGS. 2–5, jig 10 consists of an L-shaped member 12 which is stationary when placed in use as will be more particularly described below.

In contact with L-shaped member 12 is a slidable member 14 also having an upper leg 16 sliding in a groove 18 on leg 22 of member 12 and a bottom leg 23 sliding in a groove 26 of leg 28 of member 12. A vertical arm 29 joins legs 16 and 23. Double headed arrow A shows the movement of member 14. A threaded bolt 32 having a head 33 mounted in lower leg 23 extends down through a slot 34 in leg 28 and a wing nut 36 is employed to tighten L-shaped member 14 in place once properly positioned.

Figure 6:
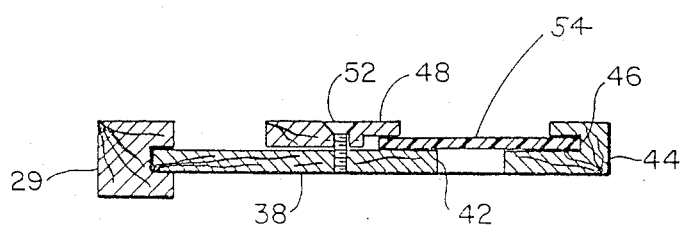
FIG. 6 is a section along 6—6 of FIG. 3.

Slidable member 14 is provided with a plate 38 having an extended slot 42 parallel to leg 22 extending between legs 16 and 23. As best seen in FIG. 6 plate 38 has a thickened edge 44 with a groove 46 whose purpose will be described later and a clamping plate 48 held on plate 38 by a pair of spaced screws 52.

Placed for movement along slot 42 are a pair of identical slides 54 and 56 made of transparent material such as Lucite. One edge of each slide 54 and 56 rides in groove 46 while the oppposite edge rides under clamping plate 48 as seenin FIG. 6, so that slides 54 and 56 are adjustable in the direction shown by double headed arrow B.

Figure 7:
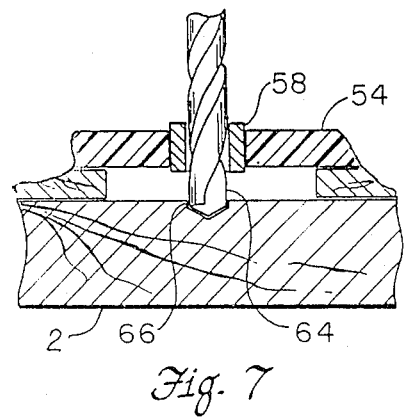
FIG. 7 is a detail of a section through a guide with the jig in use.

Each of slides 54 and 56 is provided with a tubular guide 58 and 62, respectively, of metallic construction penetrating the slide having an internal diameter to accommodate a drill bit 64 as shown in FIG. 7 for producing a hole 66 in door 2 to accommodate a screw 8. In order to accommodate different size drill bits, extra slides 54 and 56 may be provided, each pair having a different diameter set of guides, thereby insuring accurate placement of the holes. Once slides 54 and 56 are properly positioned, screws 52 are tightened to insure that they remain in place. Guides 58 and 62 would be constructed of case hardened steel for long wearing ability.

It will be noted that a ruler 68 may be mounted next to slot 42 on plate 38, and while not shown an identical ruler may be placed on the opposite face of plate 38. The transparency of slides 54 and 56 makes it possible to read the markings on the ruler. Another ruler 69 may be placed on the other side of slot 42 as an added convenience. A hair line 54a and 56a on each slide facilitates the reading. In addition a pair of rulers 72 on both sides of plate 18 may be placed on leg 28 to measure distances along 25 arrows A if desired.

In the use of jig 10, the latter is placed on a corner of a door 2 (or drawer) as shown in FIG. 2, and member 14 and slides 54 and 56 are properly positioned so that guides 58 and 62 locate where the holes for screws 8 are to be drilled. The holes are drilled right through guides 58 and 62 themselves. For a door which is the mirror image of door 2, jig 10 may be flipped over. Jig 10 can be moved from door to door (or drawer to drawer) and holes can be accurately located and drilled without further measurements or any marking.

In another embodiment of this invention, features are incorporated to permit dialing of the distance between holes, thereby avoiding the necessity of adjusting the slides carrying the holes for the kits individually.

Figure 8:
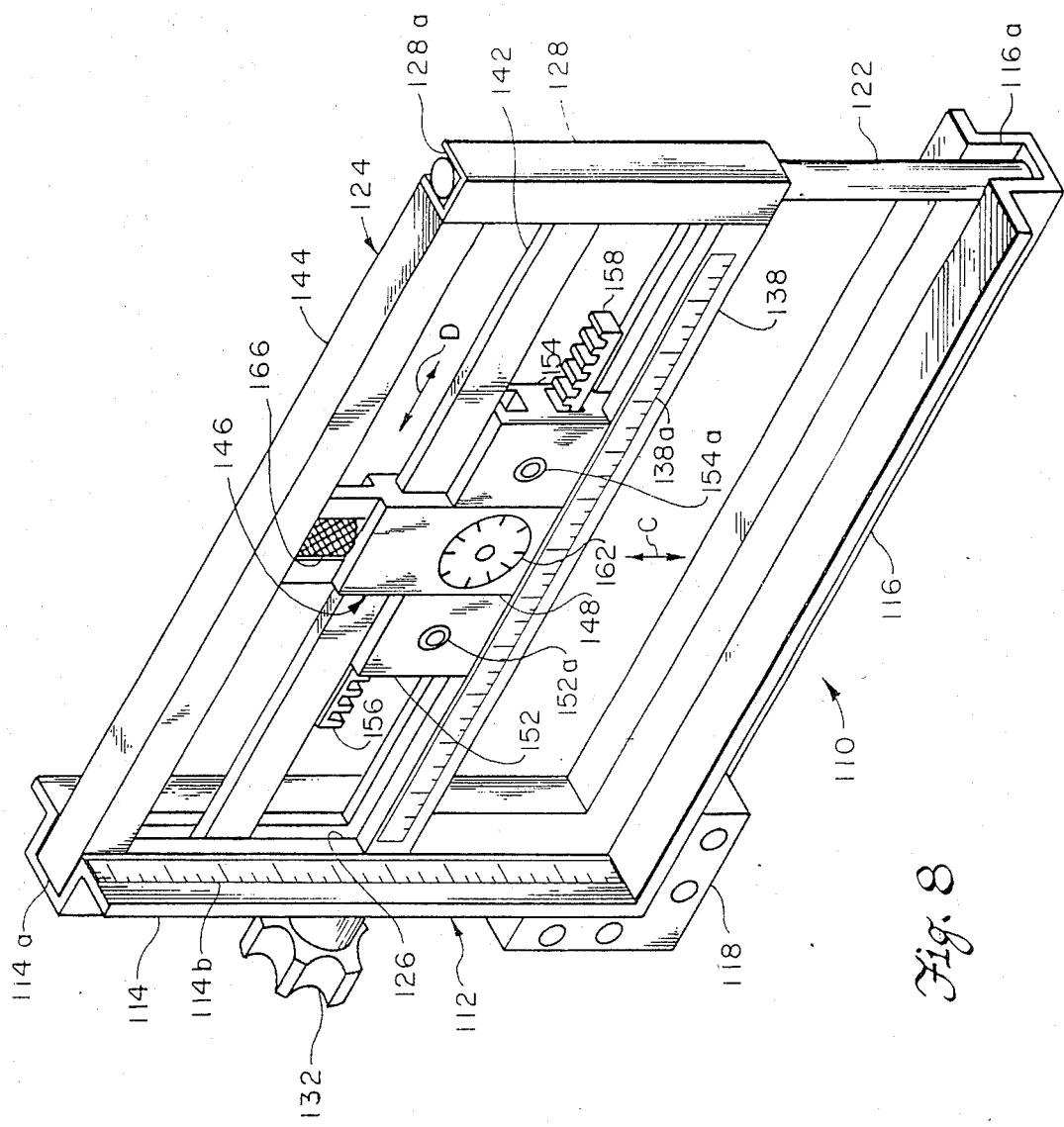
FIG. 8 is an isometric view of another embodiment of this invention.

Referring to FIG. 8, there is illustrated a jig 110 consisting of a stationary L-shaped member 112 having legs 114 and 116 reinforced by a bracket 118. Legs 114 and 116 are provided with grooves 114a and 116a for a purpose to be described, and leg 114 with a scale 114b. A rod 122 of circular cross section extends up from the bottom of groove 114b to support one end of slide assembly 124.

Slide assembly 124 consists of a member 126 riding in groove 114a, and a second member 128 having a groove 128a to accommodate rod 122, thereby permitting slide assembly 124 to move in the directions shown by arrows C. A knob 132 is threaded into member 126 through a slot (not shown) in 114 for tightening when assembly 124 is properly positioned.

Figure 9:
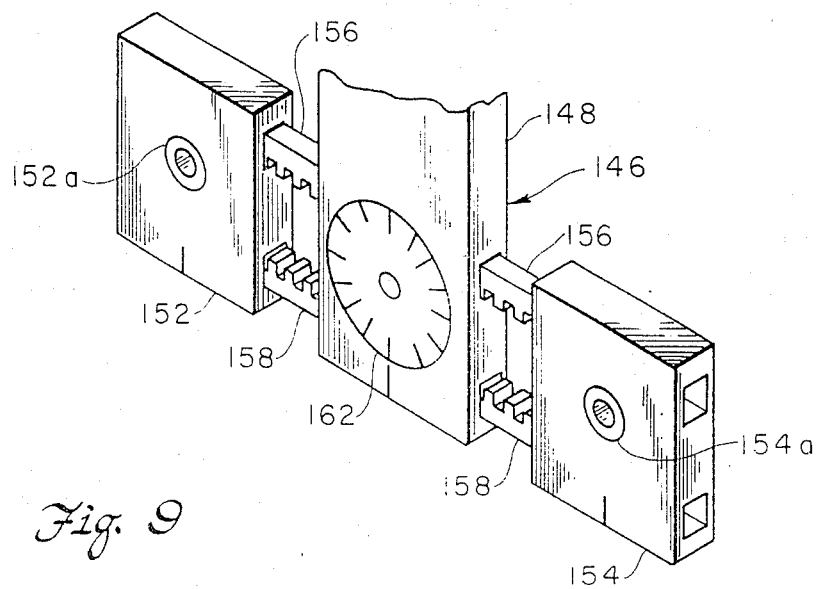
FIG. 9 is a detail of the embodiment shown in FIG. 8 with positioners moved.
Figure 10:
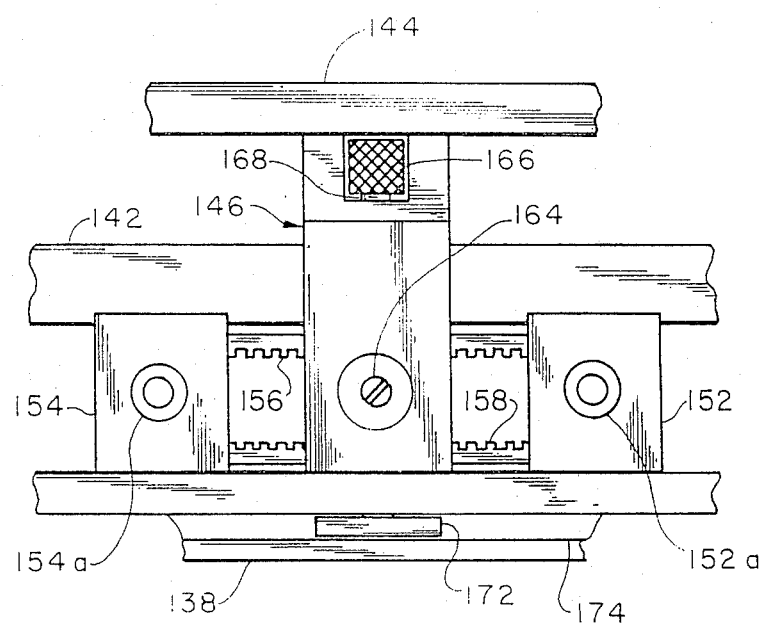
FIG. 10 is a detail of the back side of the jig shown in FIGS. 8 and 9.

Linking members 126 and 128 are a lower transverse member 138 with a scale 138a, an intermediate transverse member 142, and an upper transverse member 144. Sliding in the direction indicated by arrows D between members 138 and 144 is a slide assembly 146 consisting of a main body 148 and a pair positioners 152 and 154. Positioners 152 and 154 are connected to main body 148 by a differentially actuated rack and pinion arrangement consisting of upper and lower racks 156 and 158 connected to a pinion (not shown) joined by an indicator dial 162 on one side and a slotted head 164 on the other side shown in FIG. 10. The latter has a slot to accommodate a screw driver or a coin to be rotated to cause positioners to be moved in opposite directions as seen in FIG. 9, since positioner 154 is attached to the right end of rack 156 and positioner 152 is attached to the left end of rack 158. Each of the positioners is provided with an opening 152a and 154a, respectively, to accommocate a sleeve as described in connection with FIGS. 1-7 to permit insertion of the bit required for a particular size hole to be drilled.

A knurled knob 166 is mounted for rotation in an upper portion of main body 148. The latter is connected by way of a rod 168 threaded to engage a clamping block 172 riding in a groove 174 located in lower transverse member 138. When block 172 is loosened by knurled knob 166, assembly 146 can readily be moved in the directions indicated by double headed arrow D and hole positioners 152 and 154 can be adjusted by turning dial 162 using a thumb, or slotted member 164 using a coin or screw driver. Tightening of block 172 by knurled knob 166 will prevent movement of assembly 146 and hole positioners 152 and 154. A feature of this embodiment is the graduations on dial 162 which indicates directly the spacing between holes 152a and 154a for the holes to be drilled. It is therefore unnecessary to moe positioners 152 and 154 separately as in the previously described embodiment thereby simplifying the use of this jig.

It is understood that additional scales, some in metric dimensions, may be provided as needed.

In the operation of jig 110, the latter would be placed adjacent the corner of a cabinet drawer or door, slide assembly 124 loosened by knob 132 to position it in the direction along arrows C, and knob 132 tightened. Then, knurled knob 166 would be loosened to position slide assembly along arrows D. Dial 162 member is rotated to the exact hole spacing desired and one hole positioned which thereby would automatically locate the second hole. Knurled knob 166 would then be tightened.

Jig 110 can be constructed largely out of thin, lightweight aluminum members. The device is easy to use, requiring a minimum of tools, easy to handle due to its light weight, yet is sturdy enough for frequent use and handling, and economic to manufacture.

It is thus seen that there has been provided a jig for use in locating drill hole positions in cabinet doors and drawers which is economical to construct and easy to use. The invention eliminates the necessity to mark the position of holes before drilling them as the jig may be employed, if desired, to drill the holes directly, thereby avoiding a possible source of error.

While only a certain preferred embodiments of this invention have been described it is understood that many variations of this invention are possible without departing from the principles of this invention as defined in the claims which follow.

What is claimed is:

1. An adjustable jig for locating drill holes on cabinet doors and drawers comprising:
   a. stationary L-shaped means comprising a pair of legs at right angles to each other capable of engaging either the right or left hand corner of a cabinet door or drawer;
   b. slide assembly means mounted on said L-shaped means for movement in a direction parallel to one leg of said L-shaped means and at right angles to the other leg of said L-shaped means;
   c. means mounted on one leg of said L-shaped means to lock said slide assembly means after the latter is positioned;
   d. means mounted on said slide assembly means for locating, and accommodating a drill bit for, a pair of holes to be drilled in a cabinet door or drawer; and
   e. said mounted means comprising a main body means slidable on said slidable assembly along an axis at right angles to said one leg of said L-shaped means and parallel to said other leg of said L-shaped means, a pair of first and second positioners located on opposite sides of said main body means along said axis, differentially actuated rack and pinion means connecting said positioners to said main body means including adjustment means on said main body means utilizing said rack and pinion means to permit the simultaneous movement of said positioners along said axis to adjust the spacing between said positioners, each of said positioners including an opening for said drill bit.

2. The adjustable jig of claim 1 in which said adjustment means includes dial means whose rotation effects the displacement of said positioners.

3. The adjustable jig of claim 2 in which said dial means includes means to display the spacing between the drill bit openings on said positioners.

4. The adjustable jig of claim 3 having means to clamp said main body means and said positioners in place after being set.

5. The adjustable jig of claim 1 in which said adjustment means includes means exposed at one side of said main body means for permitting finger adjustment of the spacing of said retainers and exposed at the opposite side of said main body means to accommodate a tool for making said adjustment of the spacing.

6. The adjustable jig of claim 5 in which said means exposed at one side of said main body means includes means for displaying the distance between the holes in each of said positioners.

* * * * *